June 24, 1947. J. P. PUTNAM 2,423,049
ANGLE-MEASURING INSTRUMENT
Filed May 8, 1945 2 Sheets-Sheet 1
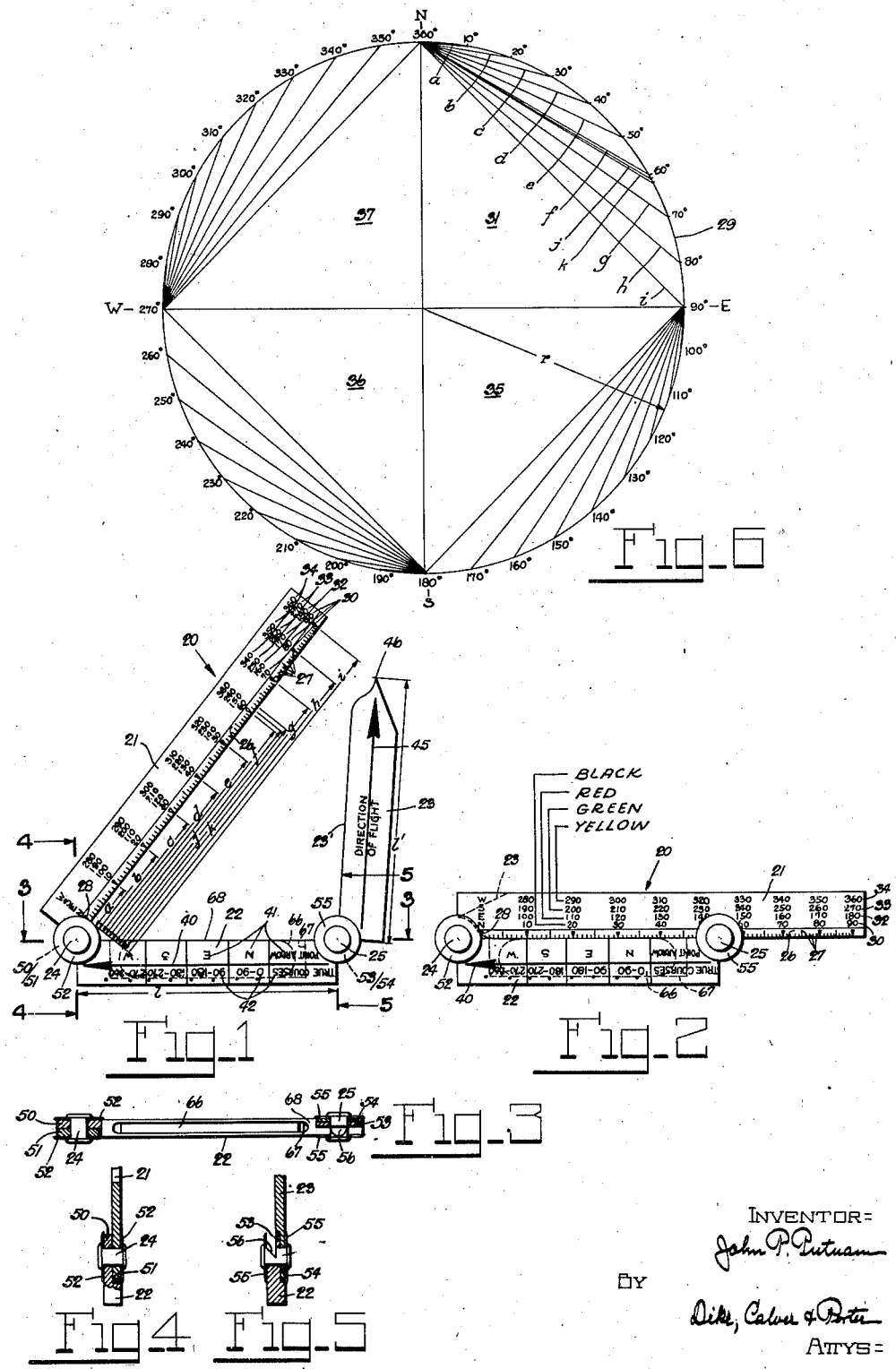

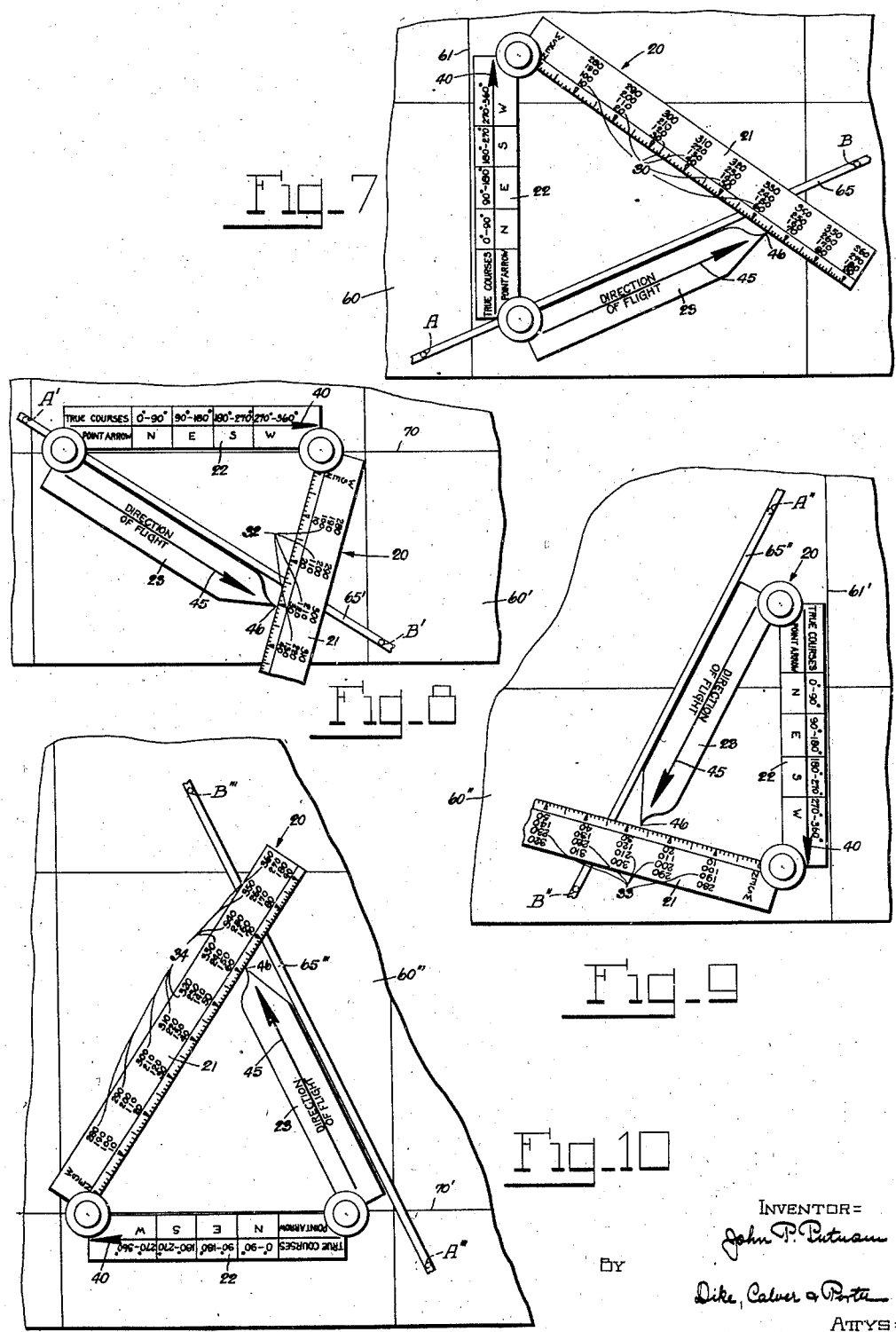

Patented June 24, 1947

2,423,049

UNITED STATES PATENT OFFICE 2,423,049

ANGLE-MEASURING INSTRUMENT

John P. Putnam, Boston, Mass., assignor to The Reece Corporation, a corporation of Maine Application May 8, 1945, Serial No. 592,565

5 Claims. (Cl. 33—98)

This invention relates to angle measuring instruments, and more particularly to an instrument for use in aircraft navigation with which to read off or plot any desired course on a map in degrees azimuth.

The instrument most commonly used for the above purpose is the conventional type of protractor. However, a protractor has to be of considerable size in order to afford accurate readings, and to safely keep a separate protractor of this size aboard an aircraft for pilotage purposes adds to the cares of the navigator. Furthermore, a protractor has to be set on a meridian on a map in order to read off the azimuth of an intended course thereon. Hence, unless the map is provided with a meridian line of sufficient length to set the protractor thereon, the navigator will have to draw a meridian on the map. Also, in order to use a protractor conveniently and obtain accurate results therefrom, the navigator usually draws on the map a line which connects the point of destination with the point of departure and intersects the printed or drawn meridian nearest the latter point. The marking of a map with lines is, however, highly objectionable since they soon render the map confusing, and if the lines are erased the map is soon illegible. In addition to the conventional protractor, band-type angle-measuring instruments have become known, but these are more objectionable than a conventional protractor, primarily because they either require mental or written computation for determining the azimuth of any course outside of the first quadrant, or lack any ready indication how to apply them to a map and read the proper azimuth in any quadrant.

It is the primary aim and object of the present invention to provide an angle-measuring instrument which is particularly suited for aerial navigation purposes and which has none of the above-mentioned disadvantages of the heretofore known angle-measuring instruments.

More particularly, the present invention contemplates an instrument which is folded to pocket size when not in use, requires neither the marking of a map with pencil lines or points, nor mental or written computation, for determining the azimuth of any course in any quadrant, and unmistakably indicates to the navigator how to apply it to the map and read the correct azimuth of any course thereon.

The invention will be more clearly understood from the following description in conjunction with the accompanying drawings, in which:

Fig. 1 is a side elevation of an instrument embodying the present invention;

Fig. 2 shows the same instrument folded;

Fig. 3 is a section taken on the line 3—3 of Fig. 1;

Figs. 4 and 5 are sections taken on the lines 4—4 and 5—5, respectively, of Fig. 1;

Fig. 6 is a diagram illustrating the principle on which the instrument is based.

Figs. 7 to 10, inclusive, illustrate the use of the instrument on a map in the different compass quadrants, respectively.

Referring to the drawings and more particularly to Fig. 1 thereof, the reference numeral 20 designates an angle-measuring instrument consisting of three linear elements 21, 22 and 23 which are pivotally connected end-to-end at 24 and 25 so as to be foldable (Figs. 1 and 2). The element 21, hereafter called the "azimuth scale," has a bevelled side edge 26 which is provided with graduations 27 representing 90 angular degrees and preferably marked every ten degrees as shown. The degree graduations 27 are spaced from the leader 28 thereof in chord lengths subtending arcs of a circle 29 of a "basic" radius $r$ (Fig. 6), which arcs, in turn, subtend angles corresponding in degrees to these graduations. Thus, the graduations 27 on the azimuth scale 21 which are marked 10, 20, 30 etc. to 90, inclusive, by a first degree group 30 are spaced from the leader 28 the distances $a$ to $i$, respectively, which are equal to the correspondingly designated chord lengths that subtend the corresponding angles in the first compass quadrant 31 of the circle 29 (Fig. 6). The intervening, unmarked graduations 27 are likewise spaced from the leader 28 in chord lengths subtending arcs in the same quadrant 31 (Fig. 6) which, in turn, subtend angles corresponding in degrees to these intervening graduations. This is clearly demonstrated, for example, by the 61 and 62 degree graduations (Fig. 1) which are spaced from the leader 28 the distances $j$ and $k$, respectively, that are equal to the correspondingly designated chord lengths (Fig. 6) which subtend angles of 61 and 62 degrees, respectively, in the first quadrant 31 of the circle 29. The other degree groups 32, 33 and 34 on the azimuth scale 21 correspond, in degrees azimuth, to the angles of the first degree group 30, in the second, third and fourth compass quadrants 35 to 37, respectively (Fig. 6). The leader 28 of the graduations 27 on the azimuth scale 21 is preferably marked with the cardinal compass points N, E, S and W for a reason which will become obvious hereinafter.

The intermediate element 22, hereafter called the "compass scale," bears a longitudinal arrow 40 pointing toward the pivot connection 24, and has inscriptions 41 and 42 on both sides of the arrow 40. The inscriptions 41 are in the nature of angular degree ranges "0°–90°," "90°–180°," "180°–270°," and "270°–360°," which are preferably headed by the explanatory phrase "True courses," while the inscriptions 42 are in the form of the cardinal compass points "N," "E," "S" and "W" which are preferably headed by the instructive phrase "Point arrow."

The element 23, hereafter called the "pointer," bears an arrow 45 and the instructive legend "Direction of flight." The free end of the pointer 23 is pointed as at 46 for cooperation with the degree graduations 27 on the azimuth scale 21 in reading the azimuth of a course on a map, for instance.

The present instrument, when not in use, is preferably folded as shown in Fig. 2. To this end, the azimuth scale 21 and the pointer 23 are made half as thick as the compass scale 22 and are so pivotally connected with said compass scale that they may be folded into the superposed relation shown in Fig. 2. More particularly, the compass scale 22 has an offset end 50 with which the adjacent end 51 of the azimuth scale 21 interfits (Figs. 1, 3 and 4); the pivot 24 extending through these interfitting ends 50, 51 and through suitable washers 52 thereon. The other end of the compass scale 22 is also offset at 53 (Figs. 3 and 4) and interfits with the adjacent offset end 54 of the pointer 23, the pivot 25 extending through these interfitting ends 53, 54 and through suitable washers 55 thereon. The pivot 25 is notched at 56 (Fig. 5) to receive the bevelled edge 26 of the azimuth scale 21 when the instrument is folded as shown in Fig. 2. The length $l$ of the compass scale 22 is equal to the length $l'$ of the pointer 23, and these lengths $l$ and $l'$ are equal to the "basic" radius $r$ of the circle 29 from which the chord lengths for the degree graduations 27 on the azimuth scale 21 are obtained. The leader 28 of the degree graduations 27 on the azimuth scale 21 is located outside the confines of the adjacent washer 52 so as to be visible, the index point 46 of the pointer 23 being accordingly offset from the side edge 23' thereof so as to bring said index point 46 of the pointer into correct relation with the degree graduations 27.

In using the instrument to determine, for instance, the azimuth of a course on a map 60 (Fig. 7) from a point of departure A to a point of destination B, the procedure is as follows: The navigator, after unfolding the instrument, aligns the pointer 23 with the course on the map so that the arrow 45 points toward the destination point B, and brings the compass scale 22 into parallelism with the nearest meridian 61 on said map. Having thus set the pointer 23 and the compass scale 22, the azimuth scale 21 is turned opposite the index point 46 of the pointer 23 and the azimuth of the course is read on said azimuth scale opposite said index point 46. Since the course indicated lies in the first compass quadrant, the azimuth of the course is read on the degree group 30. In the present instance the azimuth of the course is 65°.

In order accurately to align the pointer 23 with the course on the map, particularly where the distance between the points A and B on the map exceeds the length of the pointer 23, a pencil line connecting the points A and B may be drawn on the map. As already mentioned, however, the marking of the map with pencil lines is highly objectionable since pencil lines render the map confusing and their erasure soon renders the map illegible. It is far more practical to attach to the map, in line with the points A and B thereon, a narrow adhesive strip 65 which is preferably of the conventional "Scotch tape" type, and align the pointer 23 with said strip 65. After having served its purpose, the strip 65, being lined with non-drying cement as is characteristic of "Scotch tape," is readily removed from the map without defacing the same in any way. An oblong supply roll 66 of this strip material may conveniently be stored in a recess or cavity 67 in the side edge 68 of the compass scale 22 (Figs. 1 and 3) so that said supply roll 66 is retained in said recess 67 by the azimuth scale 21 and the pointer 23 when the instrument is folded as shown in Fig. 2. Whenever a length of the strip material is needed, the instrument is unfolded and the supply roll 66 removed from the recess 67. At all other times the supply roll 66 is preferably kept in the recess 67.

To determine the azimuth of a course in the second quadrant (Fig. 8), an adhesive strip 65' is preferably attached to the map 60' in line with the departure point A' and destination point B'. The navigator next aligns the pointer 23 with the adhesive strip 65' so that the arrow 45 points toward the destination point B', and brings the compass scale 22 into parallelism with the nearest parallel 70 on the map. Having thus set the pointer 23 and the compass scale 22, the azimuth scale 21 is turned opposite the index point 46 of the pointer 23 and the azimuth of the course is read on said azimuth scale opposite said index point 46. Since the course indicated lies in the second compass quadrant, the azimuth of the course is read on the degree group 32. In the present instance, the azimuth of the course is 121°.

To determine the azimuth of a course in the third quadrant (Fig. 9), an adhesive strip 65" is preferably attached to the map 60" in line with the departure point A" and destination point B". The navigator then aligns the pointer 23 with the adhesive strip 65" so that the arrow 45 points toward the destination point B", and brings the compass scale 22 into parallelism with the nearest meridian 61' on the map. Having thus set the pointer 23 and the compass scale 22, the azimuth scale 21 is turned opposite the index point 46 of the pointer 23 and the azimuth of the course is read on said azimuth scale opposite said index point 46. Since the course indicated lies in the third compass quadrant, the azimuth of the course is read on the degree group 33. In the present instance, the azimuth of the course is 207°.

To determine the azimuth of a course in the fourth quadrant (Fig. 10), an adhesive strip 65''' is preferably attached to the map 60''' in line with the departure point A''' and the destination point B'''. The navigator then aligns the pointer 23 with the adhesive strip 65''' so that the arrow 45 points toward the destination point B''', and brings the compass scale 22 into parallelism with the nearest parallel 70' on the map. Having thus set the pointer 23 and the compass scale 22, the azimuth scale 21 is turned opposite the index point 46 of the pointer 23 and the azimuth of the course is read on said azimuth scale opposite said index point 46. Since the course indicated lies in the fourth compass quadrant, the azimuth of the course is read on the degree group 34. In the present instance, the azimuth of the course is 332°.

A mistake in the use of the instrument is hardly possible. Thus, the grouping of the degree ranges "0°–90°," "90°–180°," "180°–270°" and "270°–360°" with the cardinal compass points "N," "E," "S" and "W," respectively, on the compass scale 22 (Fig. 1), in conjunction with the arrow 40 and the inscriptions "True courses" and "Point arrow" thereon, clearly indicate to the navigator the correct disposition of the compass scale 22 alongside, or parallel to, a meridian or parallel on a map, and the degree group on the azimuth scale 21 on which the azimuth of a course in any compass quadrant has to be read. For instance, since the arrow 40 on the compass scale 22 points due north on the map in the example shown in Fig. 7, and the cardinal compass point "N" on said compass scale is grouped with the angular degree range "0°–90°" thereon, the navigator has a clear indication that the azimuth of the course has to be read on the degree group 30 of the azimuth scale 21. Conversely, if the navigator realizes that the course on the map lies in the first compass quadrant (between 0° and 90°), the grouped compass point "N" and angular degree range "0°–90°" on the compass scale 22 clearly indicate to him that the arrow 40 on said compass scale has to point due north on the map and the compass scale has to be accordingly aligned with a meridian on the map. Likewise, if a course is known to lie in the second compass quadrant, for instance, the grouped compass point "E" and angular degree range "90°–180°" on the compass scale 22 clearly indicate to the navigator that the arrow 40 on said compass scale has to point due east on the map (Fig. 8) and the compass scale has to be accordingly aligned with a parallel on the map. Further coordination between the compass scale 22 and the azimuth scale 21 is attained by the cardinal compass points "N," "E," "S" and "W" on said azimuth scale which are grouped with the degree groups 30, 32, 33 and 34, respectively. Also, the arrow 45 with the legend "Direction of flight" on the pointer 23 aids the navigator in correctly placing said pointer so that the index point 46 thereof points toward the destination point on the map.

In order even futher to coordinate the compass scale 22 with the azimuth scale 21, the angular degree ranges "0°–90°," "90°–180°," "180°–270°" and "270°–360°" and the respective cardinal compass points "N," "E," "S" and "W" on the compass scale 22 are differently colored the same as the corresponding degree groups 30, 32, 33 and 34 and the respective cardinal compass points "N," "E," "S" and "W" on the azimuth scale 21. Thus, the angular degree range "0°–90°," and the cardinal compass point "N" grouped therewith on the compass scale 22, as well as the degree group 30 with the cardinal compass point "N" on the azimuth scale 21, may be marked black. The angular degree range "90°–180°" and the cardinal compass point "E" grouped therewith on the compass scale 22, as well as the degree group 32 and the cardinal compass point "E" on the azimuth scale 21, may be marked red, for instance. The angular degree range "180°–270°" and the cardinal compass point "S" grouped therewith on the compass scale 22, as well as the degree group 33 and the cardinal compass point "S" on the azimuth scale 21, may be marked green, for instance. Finally, the angular degree range "270°–360°" and the cardinal compass point "W" grouped therewith on the compass scale 22, as well as the degree group 34 and the cardinal compass point "W" on the azimuth scale 21, may be marked yellow, for instance.

By providing this color scheme, the navigator correctly and unmistakably coordinates the azimuth scale 21 with the compass scale 22 by merely matching colors with his eyes, so that, aside from reading the azimuth of the course, the only tasks left to the navigator involving mental activity on his part for the correct use of the instrument are the correct alignment of the compass scale 22 with a meridian or parallel on the map, as the case may be, and the correct placement of the pointer 23 in line with the course on the map such that the index point 46 points toward the destination point on the map. These tasks are, however, extremely simple. Thus, the provision of the arrow 45 with the legend "Direction of flight" on the pointer 23 should preclude any wrong placement of said pointer on the map. Also, by placing the pointer 23 on the map so that the arrow 45 points in the direction of the contemplated flight, the navigator cannot help but correctly place the compass scale 22 along a meridian or parallel on the map, as the case may be, because the navigator knows that the pointer 23 and the compass scale 22 form an acute angle for the measurement of any angle in any compass quadrant.

I claim:

1. An angle-measuring instrument having three linear elements pivotally connected end-to-end so as to be foldable, the intermediate element having a longitudinal arrow pointing toward the pivoted end of one of the outer elements and the latter element having graduations spaced from its pivoted end in chord lengths subtending different arcs of a quadrant of a circle and being marked, in four separate groups, in degrees azimuth of the angles subtended by said arcs in the four compass quadrants, respectively, of said circle, each degree group bearing the cardinal compass point in the direction of which said arrow is pointed for azimuth readings in said group, and the two non-graduated elements being each of a length equal to the radius of said circle.

2. An angle-measuring instrument according to claim 1, in which the other outer element has its free end pointed and bears a longitudinal arrow pointing toward said pointed end.

3. An angle-measuring instrument according to claim 1, in which said intermediate element is also marked with the four cardinal compass points.

4. An angle-measuring instrument having three linear elements pivotally connected end-to-end so as to be foldable, one of the outer elements having graduations spaced from its pivoted end in chord lengths subtending different arcs of a quadrant of a circle and being marked, in four separate groups, in degrees azimuth of the angles subtended by said arcs in the four compass quadrants, respectively, of said circle, the intermediate element bearing a longitudinal arrow pointing toward the pivot connection with said one element, the cardinal compass points N, E, S and W and, grouped with said points, the angular degree ranges 0–90, 90–180, 180–270 and 270–360, respectively, and the two non-graduated elements being each of a length equal to the radius of said circle.

5. An angle-measuring instrument having three linear elements pivotally connected end-to-end so as to be foldable, the intermediate element bearing the cardinal compass points in different colors and a longitudinal arrow pointing toward the pivoted end of one of the outer elements, and the latter element having graduations spaced from its pivoted end in chord lengths subtending different arcs of a quadrant of a circle and being marked, in four separate groups, in degrees azimuth of the angles subtended by said arcs in the four compass quadrants, respectively, of said circle, each degree group being colored the same as the cardinal compass point on the intermediate element in the direction of which said arrow is pointed for azimuth readings in said group, and the two non-graduated elements being each of a length equal to the radius of said circle.

JOHN P. PUTNAM.

REFERENCES CITED

The following references are of record in the file of this patent:

UNITED STATES PATENTS

| Number | Name | Date |
|---|---|---|
| 964,456 | Smith | July 12, 1910 |
| 1,320,689 | Hart | Nov. 4, 1919 |
| 1,389,940 | Harriman | Sept. 6, 1921 |
| 1,473,860 | Mullarkey | Nov. 13, 1923 |
| 228,027 | Bissell | May 25, 1880 |
| 409,414 | Meek | Aug. 20, 1889 |